US012128910B2

(12) United States Patent
Sennott et al.

(10) Patent No.: US 12,128,910 B2
(45) Date of Patent: *Oct. 29, 2024

(54) ENHANCED SENSOR CLEANING VALIDATION

(71) Applicant: ARGO AI, LLC, Pittsburgh, PA (US)

(72) Inventors: Casey J. Sennott, Pittsburgh, PA (US); Morgan M. Wagner, Pittsburgh, PA (US); Dustin Ryan Yautz, Wexford, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,312

(22) Filed: Sep. 20, 2022

(65) Prior Publication Data
US 2023/0009762 A1   Jan. 12, 2023

Related U.S. Application Data

(63) Continuation of application No. 16/986,952, filed on Aug. 6, 2020, now Pat. No. 11,458,980.

(51) Int. Cl.
B60W 50/02      (2012.01)
B60Q 11/00      (2006.01)
(Continued)

(52) U.S. Cl.
CPC ......... *B60W 50/0205* (2013.01); *B60Q 11/00* (2013.01); *B60S 1/46* (2013.01); *B60S 1/54* (2013.01); *B60W 50/04* (2013.01); *B60W 2050/0215* (2013.01); *B60W 2556/20* (2020.02); *B60W 2556/25* (2020.02)

(58) Field of Classification Search
None
See application file for complete search history.

(56) References Cited

U.S. PATENT DOCUMENTS

2016/0282874 A1   9/2016   Kurata et al.
2016/0371977 A1   12/2016  Wingate et al.
(Continued)

OTHER PUBLICATIONS

International Search Report and Written Opinion of the International Searching Authority directed to related International Patent Application No. PCT/US2021/045059, mailed Nov. 26, 2021; 10 pages.

(Continued)

*Primary Examiner* — Peter D Nolan
*Assistant Examiner* — Mikko Okechukwu Obioha
(74) *Attorney, Agent, or Firm* — Sterne, Kessler, Goldstein & Fox P.L.L.C.

(57) ABSTRACT

Devices, systems, and methods are provided for enhanced sensor cleaning validation. A device may receive a signal from a sensor indicative of an obstruction on the sensor. The device may activate a cleaning system at a degree of actuation responsive to the obstruction. The device may then obtain a first post-clean performance measurement of the sensor. The device may then adjust the degree of actuation of the cleaning system based on a degradation measurement between a baseline performance measurement associated with a clean performance baseline of the sensor and the first post-clean performance measurement.

20 Claims, 6 Drawing Sheets

(51) Int. Cl.
*B60S 1/46* (2006.01)
*B60S 1/54* (2006.01)
*B60W 50/04* (2006.01)

(56) References Cited

U.S. PATENT DOCUMENTS

| | | |
|---|---|---|
| 2018/0009418 A1 | 1/2018 | Newman |
| 2018/0290632 A1 | 10/2018 | Rice et al. |
| 2018/0370496 A1 | 12/2018 | Sykula et al. |
| 2018/0370500 A1 | 12/2018 | Garcia Crespo et al. |
| 2019/0073908 A1 | 3/2019 | Neubecker et al. |
| 2019/0092287 A1 | 3/2019 | Leach et al. |
| 2019/0106085 A1 | 4/2019 | Bacchus et al. |
| 2019/0135239 A1 | 5/2019 | Rice |
| 2019/0152447 A1 | 5/2019 | Hansen et al. |
| 2019/0283729 A1 | 9/2019 | Ikebata et al. |
| 2019/0322245 A1 | 10/2019 | Kline et al. |
| 2019/0351879 A1 | 11/2019 | Kim et al. |
| 2020/0086833 A1 | 3/2020 | Frederick et al. |
| 2020/0088857 A1 | 3/2020 | Goldberg |
| 2020/0108801 A1 | 4/2020 | Frederick et al. |
| 2021/0107040 A1* | 4/2021 | Violetta ................. B08B 3/041 |
| 2022/0041173 A1* | 2/2022 | Sennott ................. G01S 13/931 |

OTHER PUBLICATIONS

Ramalingam et al. "Vision-Based Dirt Detection and Adaptive Tiling Scheme for Selective Area Coverage," Hindawi Journal of Sensors, vol. 2018, Dec. 2018, pp. 1-13.

* cited by examiner

ENHANCED SENSOR CLEANING VALIDATION

RELATED APPLICATION

This application is a continuation of U.S. patent application Ser. No. 16/986,952, filed Aug. 6, 2020, and is incorporated herein by reference in its entirety.

TECHNICAL FIELD

This disclosure generally relates to systems and methods for enhanced sensor cleaning validation.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise visual spectrum cameras, laser-ranging devices (e.g., LIDARs), thermal sensors, or other types of sensors. The sensor system enables a vehicle to detect objects and obstacles in the vicinity of the vehicle and tracks the distance, velocity, and direction of pedestrians, other vehicles, traffic lights, or similar objects in the environment around the vehicle. However, these sensors may become hindered by obstructions that may interfere with the normal operation of the sensors as the vehicle is operated. The presence of obstructions that may limit the normal operation of the sensors may require intervention to attempt to restore the sensors to a state close to an original state. Therefore, there is a need to enhance the operation of sensors to ensure that obstructions do not undermine the sensor system performance.

Figure 1:
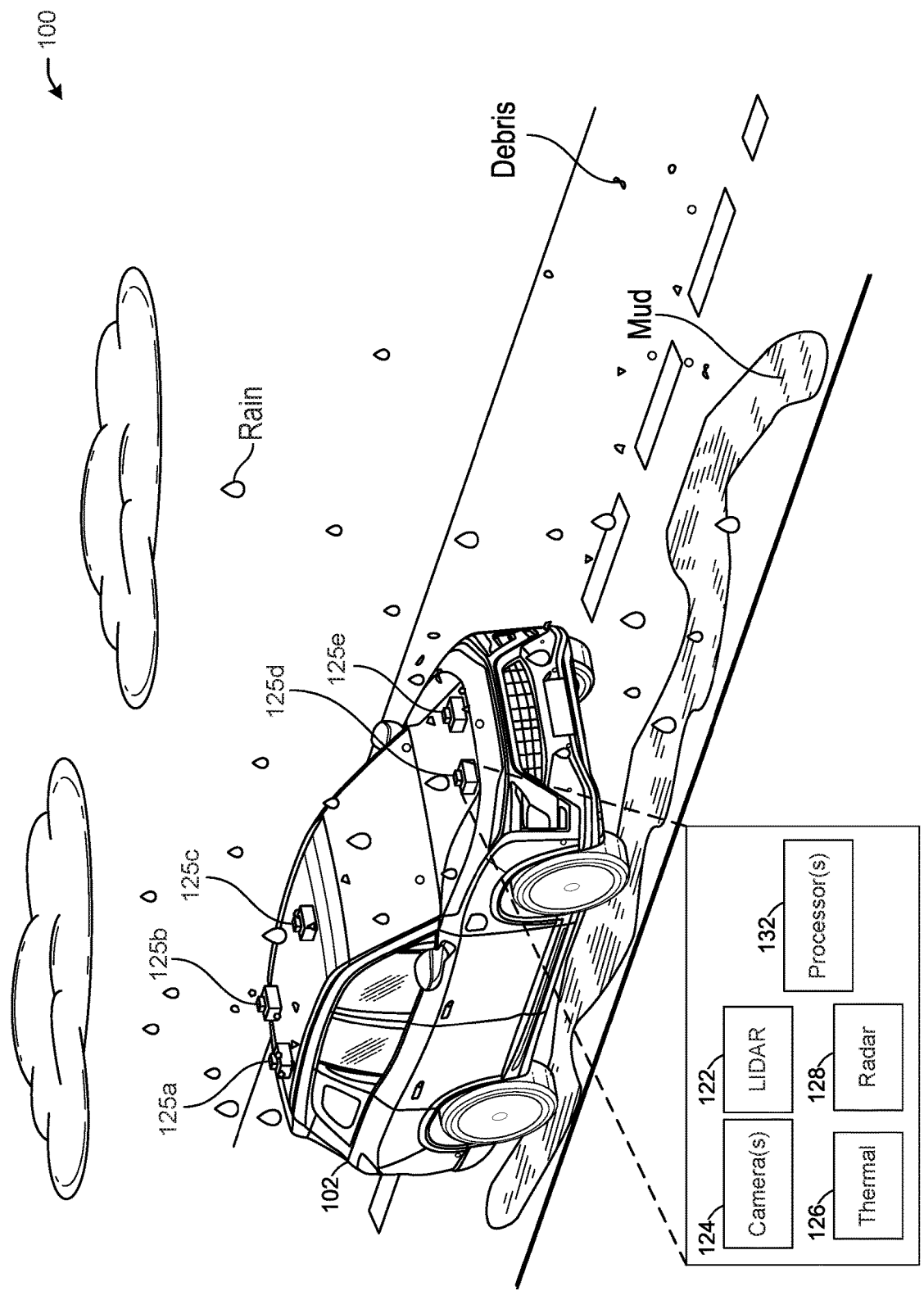
FIG. 1 illustrates example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include light detection and ranging (LIDAR) sensors, stereo cameras, radar sensors, thermal sensors, or other sensors attached to an autonomous vehicle. These sensors may be originally used in a lab environment to perform high precision analyses of their performance under certain conditions. Autonomous vehicles may be driven in the real world and rely on the attached sensors to perform to a certain performance level under environmental factors. As the autonomous vehicles are driven in the real world, the sensors are exposed to these environmental factors, but also there may be more factors than what was tested in the lab environment. This may be due to various conditions that may occur in the real world that are different from a controlled lab environment. This may create a new environment and various consequences based on this new environment. One of the challenges that may be faced by exposing the sensors to a new environment is attempting to restore the sensors to a state close to the original state.

Sensors may be exposed to obstructions that could get deposited on the lenses of the sensors or may block the sensors. Some of the obstructions may include debris, mud, rain droplets, or any other objects that would hinder the normal operation of a sensor. In some embodiments, an autonomous vehicle may comprise a cleaning system associated with cleaning obstruction on sensors of the autonomous vehicle. One challenge may be determining if a cleaning system of an autonomous vehicle has adequately cleaned the sensors and their lenses such that the sensors are restored to a state that is close to an original state of the sensors.

Example embodiments described herein provide certain systems, methods, and devices for enhanced sensor cleaning validation.

In one or more embodiments, an enhanced sensor cleaning validation system may rely on performance measurement techniques employed to measure the performance of a sensor. For example, performance measurement techniques may comprise measuring the intensity of light reflected by an object, measuring attenuation of signal strength, measuring performance metrics associated with the type of sensor, or any other technique that returns performance measurements that may be compared using the various embodiments of this disclosure.

In one or more embodiments, an enhanced sensor cleaning validation system may assess whether an enhanced sensor cleaning validation system that has been applied to a sensor after obstructions have impacted the sensors' normal operation is performing at a validation threshold in order to qualify the enhanced sensor cleaning validation system as an acceptable cleaning system. An enhanced sensor cleaning validation system may, in some scenarios, spray fluids on the obstruction then may cause airflow to push the droplets of the sprayed fluids off of the sensor, where the droplets now contain residue of the obstruction.

In one or more embodiments, an enhanced sensor cleaning validation system may validate an enhanced sensor cleaning validation system by providing operational parameters associated with the performance of the enhanced sensor cleaning validation system after being exposed to environmental factors such as debris, mud, rain droplets, etc. The operational parameters provide vehicle software applications that rely on the sensor data being collected during operation of the sensor with expected performance levels under these environmental factors in order to process the sensor data in conjunction with these operational parameters. For example, after the enhanced sensor cleaning validation system determines the expected performance levels, the software applications are then capable of evaluating the sensor data based on the operational parameters generated by the enhanced sensor cleaning validation system in order to implement compensation mechanisms when evaluating the collected sensor data. In one or more embodiments, an enhanced sensor cleaning validation system may determine the performance of the enhanced sensor cleaning validation system after the sensors have been exposed to environmental noise factors by using a baseline clean performance measurement and a post-cleaning performance measurement. The measure of the cleanliness of the sensor is not based on how clean a sensor is but instead how well the sensor performs, even though the sensor may not be fully cleaned. That is, the performance measurement after the sensor has been cleaned by an enhanced sensor cleaning validation system may be based on the performance of the sensor post-cleaning as opposed to determining how many particles of the environmental noise (e.g., obstructions such as debris, mud, rain droplets, etc.) remain on the sensor or the sensor lens.

In one or more embodiments, an enhanced sensor cleaning validation system may determine a relative degradation in the performance of the sensor as a result of the environmental noise impacting the sensor.

In some instances, one purpose of the enhanced sensor cleaning validation system may be to improve one aspect of the sensor performance. However, triggering the enhanced sensor cleaning validation system to clean a sensor may enhance one aspect and at the same time may degrade another aspect of the sensor performance. For example, if there is dust on a LIDAR sensor, the enhanced sensor cleaning validation system may improve one aspect of a LIDAR sensor performance but degrade another aspect of the LIDAR sensor performance. When the enhanced sensor cleaning validation system is applied to remove the dust, the LIDAR sensor performance may be improved by the removal of dust but water droplets that were used by spraying fluids to clean the LIDAR sensor may become an additional factor causing degradation of the LIDAR sensor performance as a result of applying the enhanced sensor cleaning validation system.

In one or more embodiments, an enhanced sensor cleaning validation system may identify factors that may be used to measure sensor performance and calculate the difference between a first performance measurement and a second performance measurement. However, this calculation may measure an attenuation loss but does not show the efficiency of the cleaning system and whether the enhanced sensor cleaning validation system has been able to achieve what it was supposed to achieve.

In one or more embodiments, an enhanced sensor cleaning validation system may determine a ratio that is based on initial sensor performance and post-clean sensor performance. The enhanced sensor cleaning validation system may measure an initial sensor performance when the sensor is considered in a clean state. This state may be a baseline clean state that is used to determine the efficacy of an enhanced sensor cleaning validation system after the enhanced sensor cleaning validation system has been applied. An obstruction may be applied to the sensor in a controlled manner to establish a controlled starting point. In order to make sure the application of obstruction is consistent throughout the various tests, a performance measurement ratio should be taken after the application of the obstruction to ensure every performance measurement ratio after the application of the obstruction between the clean state and the dirty state is within a certain range. For example, after applying the obstruction, the performance measurement ratio between the clean state and the dirty state may be between 0.7 and 0.95. It should be understood that this range is only for illustration purposes, and other ranges for a performance measurement ratio between the clean state and the dirty state may be set by the administrator of the test. In the case that the performance measurement ratio between the clean state and the dirty state is not within the range, the test may be reset by performing a manual cleaning of the sensor lens, for example, using a cleaning cloth or other means to clean the sensor lens.

After that, the enhanced sensor cleaning validation system may be applied to remove the obstruction from the sensor. The enhanced sensor cleaning validation system may facilitate a post-clean sensor performance measurement. The enhanced sensor cleaning validation system may facilitate a division of the post-clean sensor performance measurement and the initial sensor performance measurement. The resulting ratio of performance may indicate how well the enhanced sensor cleaning validation system has performed. Multiple ratio values may be obtained at different measurement instances, which would then be evaluated to determine the validation of the enhanced sensor cleaning validation system. For example, a predetermined number of detected points may be expected when a sensor is 100% clean (e.g., 100 points on the target). In that case, the baseline clean performance measurement may be considered as 100 points. An obstruction may be applied to the target, for example, debris, mud, rain droplets, or other types of environmental noise. However, it should be understood that a clean state may not be 100% clean as some minimal debris may persist even when a sensor lens is manually cleaned, for example, with a cleaning cloth. It is important to note that the baseline clean performance measurement may be determined by measuring a clean lens multiple times to determine an average clean performance measurement, which would then be used as the baseline to compare other measurements (e.g., after applying obstruction or after removing the obstruction) to it. An enhanced sensor cleaning validation system may be initiated to clean the sensor to attempt to remove the obstruction. An enhanced sensor cleaning validation system may determine a post-cleaning sensor performance measurement after the enhanced sensor cleaning validation system has completed its function. For example, the post-cleaning sensor performance measurement may determine a detection of 90 points off of the target. The enhanced sensor cleaning validation system may determine the ratio of the baseline clean measurement relative to the post-cleaning measurement. In this example, the ratio may be equal to 90 divided by 100, which is 0.9. This use of a ratio allows the various measurements that may be taken over time to stay relative to the baseline. If only a difference measurement is taken (e.g., 100−90=10 points), this difference measurement may be deceiving because depending on the type of sensor, the difference may not be scalable to a measurement take for another sensor under similar conditions. However, using a ratio, it is possible to scale the ratio independently from the type of sensor and the type of condition.

In one or more embodiments, a sensor system may collect point clouds, which may be transformed into metrics that may be used to evaluate the performance of the sensor. Point clouds are essentially datasets that represent objects or space. Point clouds collate a large number of single spatial measurements into a dataset that can then represent a whole. Point clouds are most commonly generated using 3D laser scanners and LiDAR technology and techniques. The enhanced sensor cleaning validation system may utilize a transformation module that transforms and convert data to values that can be used in evaluating the performance of the sensor. For example, point clouds may be converted into intensity loss or refraction of points associated with a target. The attenuation may be caused by the obstruction on the sensor, and the refraction may be caused by droplets on the sensor.

In one or more embodiments, an enhanced sensor cleaning validation system may determine, when the obstruction is rain droplets, a ratio that is based on an initial sensor performance before rain droplets are present on the sensor and a post-clean sensor performance after the passage of a time period with or without airflow. In this scenario, the enhanced sensor cleaning validation system does not get triggered to spray fluids on the sensor since rain droplets may be removed with or without airflow. However, the enhanced sensor cleaning validation system may control the airflow by adjusting the velocity air velocity directed to the sensor. This also may depend on the rain rate and how quickly the sensor can recover during a rain condition as more and more droplets get deposited on the sensor.

In one or more embodiments, an enhanced sensor cleaning validation system may determine a sensor performance measurement before a rain condition, which may be considered as a baseline clean performance measurement. A measurement may be taken at a predetermined interval, as the rain droplets been deposited at a certain rain rate to determine a rain sensor performance measurement. Over time, droplets may be removed from the sensor due to evaporation or due to having airflow against the sensor. Data points may be collected at the predetermined interval. A ratio of sensor performance measurement is then compiled of the various data points at the predetermined interval. For example, in a rain mitigation system, rain droplets are hitting the lens of a LIDAR sensor that may reduce its performance as the vehicle operates in the rain. For example, the LIDAR sensor's reduced performance may go from 100% to 95% at a specific time instance. An enhanced sensor cleaning validation system may evaluate the desired airflow to remove rain droplets at a rate fast enough compared to the rain rate. Measurements may be taken without airflow, and measurements will be taken with airflow. The airflow velocity may be adjusted in order to improve the LIDAR sensor's performance. In some embodiments, the enhanced sensor cleaning validation system may determine mean values and standard deviation values associated with 1) no rain, 2) rain with a predetermined airflow, and 3) no airflow. The mean value/standard deviation may be determined based on determining the mean value of a plurality of ratio measurements of sensor performance measurement. These mean values may be displayed using an output device to display a plot comparing the mean values under these conditions in order to validate the rain mitigation system.

In one or more embodiments, an enhanced sensor cleaning validation system may evaluate sensor and cleaning system performance, but it may also be used to evaluate the performance of an on-vehicle obstruction detection system that triggers the cleaning system in a normal operation. It should be noted that the enhanced sensor cleaning validation system may be able to achieve very high performance measurement resolution because it can compare back to controlled baseline data and large data sets. The on-vehicle obstruction detection system may need to perform without this additional information. The performance of the on-vehicle obstruction detection system performance may be evaluated using the enhanced sensor cleaning validation system to provide information on the accuracy of the system (ratio of false-positives vs false-negatives) given the validation threshold value. The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

Referring to FIG. 1, there is shown a vehicle 102 comprising one or more sensors 125 (e.g., 125a, 125b, 125c, 125d, 125e, or other sensors not shown in the FIG. 1). The one or more sensors 125 may be associated with a plurality of cameras, emitters, and sensors. The one or more sensors 125 may be connected to the vehicle 102 (e.g., at various locations on the vehicle 102). In this environment 100, there shown that one or more sensors 125 include cameras such as stereo. The stereo cameras may capture images of objects in the vicinity and around the vehicle 102. Other emitters and sensors may transmit and/or receive one or more signals in order to detect and/or capture information associated with objects in the vicinity and around the vehicle 102. For example, a LIDAR sensor may transmit a LIDAR signal (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the one or more sensors 125 may include LIDAR 122. Some examples of a LIDAR such as Geiger mode LIDAR, ground-based LIDAR, large footprint LIDAR, small footprint LIDAR, or the like. The one or more sensors 125 may include camera(s) 124 such as stereo cameras that may capture images in the vicinity of the vehicle 102. The one or more sensors 125 may include a thermal sensor 126, such as thermistors, resistance temperature detectors, thermocouples, semiconductors, or the like. Further, the one or more sensors 125 may include a radar 128, which may be any radar that uses radio waves to capture data from objects surrounding the vehicle 102. The one or more sensors 125 may also include one or more processor(s) 132. The one or more processor(s) 132 may control the transmission and reception of signals associated with the LIDAR 122, the camera(s) 124, the thermal sensor 126, and the radar 128. The various sensors of the one or more sensors 125, when operating under normal conditions, should perform according to its intended use. However, the vehicle 102 may be subjected to environmental obstructions such as debris, mud, rain droplets, or any other objects that would hinder the normal operation of the one or more sensors 125. Under such environmental obstructions, the environmental obstructions may underperform due to obscuring the path of signals being sent and/or received by the one or more sensors 125. This would result in the data received from these various sensors to be unreliable when processed by processor(s) 132.

In one or more embodiments, an enhanced sensor cleaning validation system may facilitate the verifying the performance of sensors (e.g., any of the one or more sensors 125) to meet certain thresholds after being exposed to the variety of obstructions that could cause the underperformance of the one or more sensors 125. The enhanced sensor cleaning validation system may be used to validate a cleaning system that may be used after the obstruction has accumulated on the one or more sensors 125 in real-life scenarios like driving vehicle 102 on a road during such conditions. The enhanced sensor cleaning validation system may be used in a test environment independent of the vehicle 102 by applying obstructions and the enhanced sensor cleaning validation system. In some examples, validating an enhanced sensor cleaning validation system may include determining whether the enhanced sensor cleaning validation system performed to an expected level and also to capture performance parameters associated with the enhanced sensor cleaning validation system such that they may be used during real-world operation and expected performance level while cleaning sensors associated with the vehicle. For example, vehicle 102 may be driven on a road under environmental conditions that may cause obstructions such as debris, mud, or rain droplets to land on the surface of the sensor. The obstructions may impact the normal operation of the sensor. An enhanced sensor cleaning validation system may validate an enhanced sensor cleaning validation system by providing operational parameters associated with the performance of the enhanced sensor cleaning validation system after being exposed to environmental factors such as debris, mud, rain droplets, etc. The operational parameters provide vehicle software applications that rely on the sensor data being collected during operation of the sensor with expected performance levels under these environmental factors in order to process the sensor data in conjunction with these operational parameters. For example, after the enhanced sensor cleaning validation system determines the expected performance levels, the software applications are then capable of evaluating the sensor data based on the operational parameters generated sensor cleaning validation system in order to implement compensation mechanisms when evaluating the collected sensor data.

It is understood that the above descriptions are for purposes of illustration and are not meant to be limiting.

Figure 2:
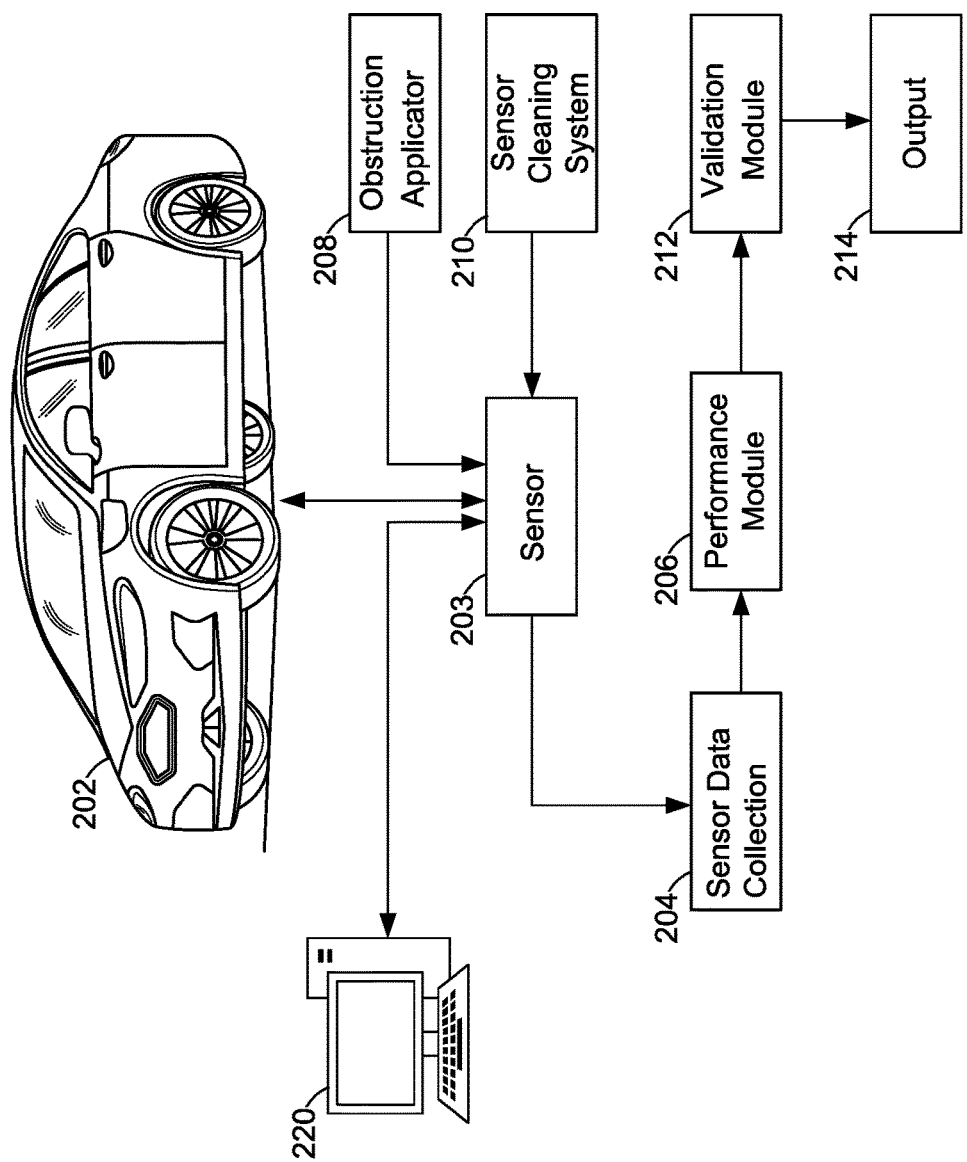
FIG. 2 depicts an illustrative schematic diagram for enhanced sensor cleaning validation, in accordance with one or more example embodiments of the present disclosure.

FIG. 2 depicts an illustrative schematic diagram for a sensor validation environment 200, in accordance with one or more example embodiments of the present disclosure.

Referring to FIG. 2, there is shown a sensor 203 that is under test for validation before the sensor is utilized on a vehicle 202. In FIG. 2, there is also shown an obstruction applicator 208, an enhanced sensor cleaning validation system 210, a sensor data collection 204, a performance module 206, a validation module 212, and an output 214.

The sensor 203 may be any of the one or more sensors 125 of FIG. 1. The sensor 203 may be tested and validated before being placed in real-world operations, where the vehicle 202 is operating in a real-world environment using the sensor 203 to capture data associated with objects in the vicinity of the vehicle 202.

The sensor data collection 204 may be a data collection mechanism that collects data captured by the sensor 203. The sensor data may include signal information captured after being emitted and then received by the sensor 203, in the case of the sensor 203 is a LIDAR. In the case the sensor 203 is a camera, the sensor data may be image data capture by the camera. The sensor data may be the heat signature of an object or radar data that may be data associated with a radio signal that is transmitted after being aimed by an antenna in a particular direction, then a receiver detects the echoes off any objects in the path of the radio signal. The sensor data collection 204 may collect sensor data when the sensor 203 is in a clean state is free from obstructions, or it may collect sensor data after the sensor 203 has been subjected to an obstruction.

The obstruction applicator 208 may be a means to apply obstruction to the sensor 203. For example, the obstruction applicator 208 may apply as debris, mud, rain droplets, or other objects that may hinder the normal operation of the sensor 203. The obstruction applicator 208 may apply one or more obstructions at a quantity or rate set by a system administrator. This provides control over the amount of obstruction to be applied in order to validate the enhanced sensor cleaning validation system 210 at these various quantities or rates.

The enhanced sensor cleaning validation system 210 may facilitate spray fluids on the obstruction in order to dilute the obstruction before removing it off of the sensor 203. The enhanced sensor cleaning validation system 210 may then cause airflow to push the droplets of the sprayed fluids off of the sensor 203, where the droplets contain residue of the obstruction after spraying fluids on the obstruction. For example, if the sensor 203 was subjected to mud that got deposited on the sensor, the enhanced sensor cleaning validation system 210 may spray fluids to break up the mud and dilute it. The enhanced sensor cleaning validation system 210 may then cause an airflow that pushes away the droplets of the fluid that now contains the mud particles in order to push them off of the sensor 203.

The performance module 206 may perform performance measurements that utilize the sensor data that was collected by the sensor data collection 204 before and after the application of the obstruction using the obstruction applicator 208. The performance module 206 may apply performance measurement techniques, which comprise measuring an intensity of light reflected by an object, measuring attenuation of signal strength, measuring performance metrics associated with the type of sensor, or any other technique that returns performance measurements that may be compared.

The performance module 206 may determine an initial performance measurement of sensor 203, where the initial performance measurement is determined when the sensor 203 is in a clean state. The performance module 206 may determine a post-clean performance measurement of sensor 203, where the post-clean performance measurement is determined after the sensor 203 has been cleaned using the enhanced sensor cleaning validation system 210. The initial performance measurement may be a baseline clean state that is used to determine the efficacy of an enhanced sensor cleaning validation system after the enhanced sensor cleaning validation system 210 has been applied to remove an obstruction that may have been introduced to the sensor 203. After that, the enhanced sensor cleaning validation system 210 may be applied to remove the obstruction from the sensor 203. The performance module 206 may determine a ratio equal to the post-clean performance measurement divided by the initial performance measurement of sensor 203.

The validation module 212 may provide a mechanism to qualify an enhanced sensor cleaning validation system by determining how well the cleaning system is performing and whether the cleaning system is at an expected level of performance over multiple sample measurements. The validation module 212 may validate an enhanced sensor cleaning validation system by providing operational parameters associated with the performance of the enhanced sensor cleaning validation system after being exposed to environmental factors such as debris, mud, rain droplets, etc. The operational parameters provide vehicle software applications that rely on the sensor data being collected during operation of the sensor with expected performance levels under these environmental factors in order to process the sensor data in conjunction with these operational parameters. For example, after the enhanced sensor cleaning validation system determines the expected performance levels, the software applications are then capable of evaluating the sensor data based on the operational parameters generated sensor cleaning validation system in order to implement compensation mechanisms when evaluating the collected sensor data.

The output module 214 may output the performance measurement in a graphical representation using the determined ratio between the post-clean performance measurement and the initial performance measurement of sensor 203.

It is understood that the above descriptions are for purposes of illustration and are not meant to be limiting.

Figure 3:
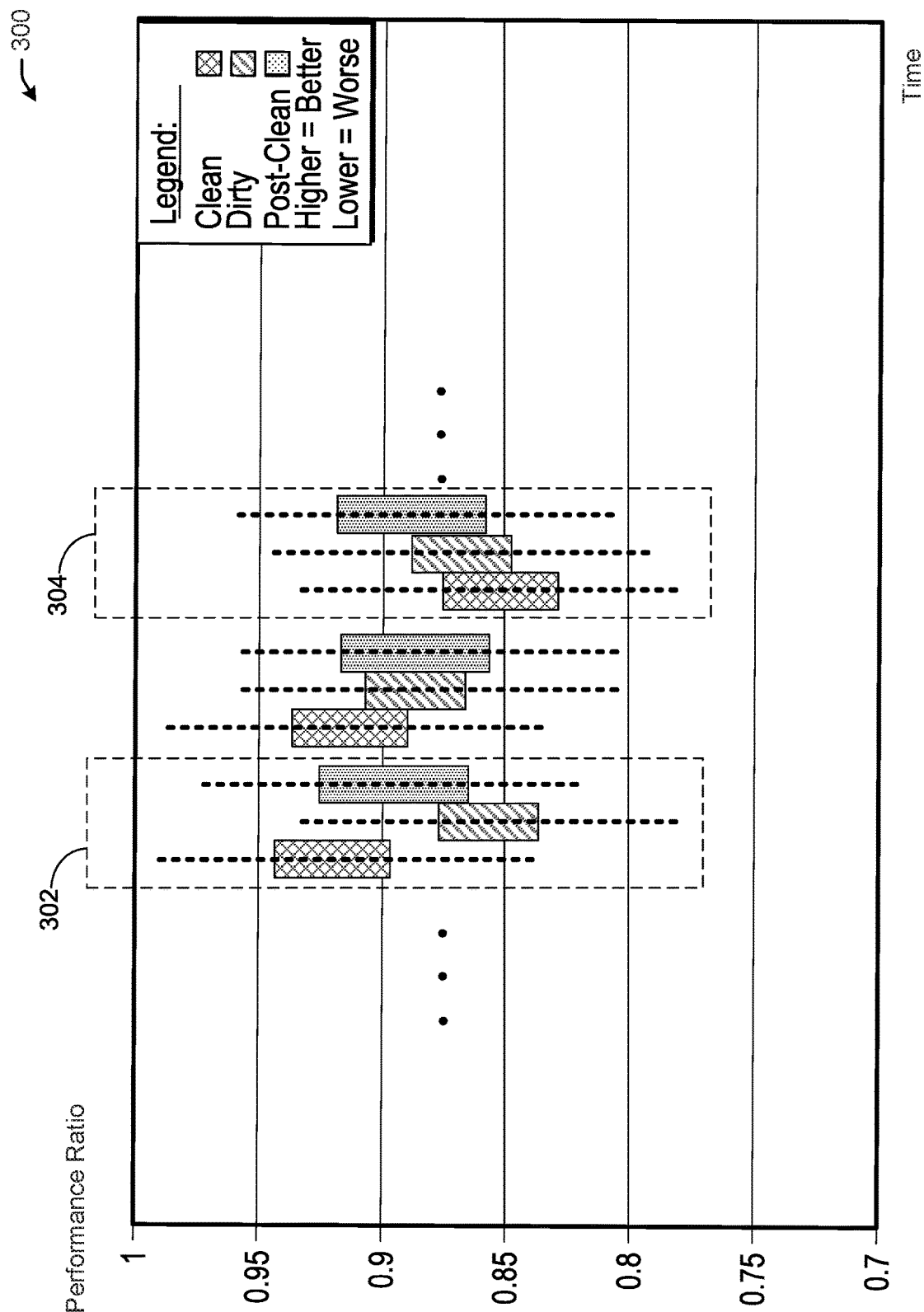
FIG. 3 depicts an illustrative schematic diagram for enhanced sensor cleaning validation, in accordance with one or more example embodiments of the present disclosure.

FIG. 3 depicts an illustrative schematic diagram for enhanced sensor cleaning validation, in accordance with one or more example embodiments of the present disclosure.

Referring to FIG. 3, there is shown a performance ratio chart between three types of sensor conditions. These three types of sensor conditions include a clean state, a dirty state, and a post-clean state. The ratio is based on initial sensor performance, a dirty sensor performance, and post-clean sensor performance. It should be noted that the 'clean', 'dirty', and 'post-clean' states can be graphed together using the raw performance metric, but once the performance ratio is calculated, the 'clean' state necessarily drops off because it would always result in a distribution around 1 (because the ratio divides all of the other states by the clean state values).

The enhanced sensor cleaning validation system may measure an initial sensor performance when the sensor is considered in a clean state, which is a state where the sensor lens has been manually cleaned. This state may be used as a baseline state to determine how efficient an enhanced sensor cleaning validation system is after the enhanced sensor cleaning validation system has been applied to remove an obstruction. An obstruction may be applied to the sensor in a controlled manner to establish a controlled starting point. In order to make the application of obstruction is consistent throughout the various tests, a performance measurement ratio should be taken after the application of the obstruction to ensure every performance measurement ratio after the application of the obstruction between the clean state and the dirty state is within a certain range. For example, after applying the obstruction, the performance measurement ratio between the clean state and the dirty state may be between 0.7 and 0.95. It should be understood that this range is only for illustration purposes, and other ranges for a performance measurement ratio between the clean state and the dirty state may be set by the administrator of the test. In the case that the performance measurement ratio between the clean state and the dirty state is not within the range, the test may be reset by performing a manual cleaning of the sensor lens, for example, using a cleaning cloth or other means to clean the sensor lens. Single outlier values may occur and be acceptable, but if the mean/median of the distribution or the size of the distribution is statistically different than the other tests, they will contain additional noise in the measurement. Because this data is post-processed and relies on distributions, it can only be done after-the-fact. Therefore, the data would need to be recollected (with better control over the factor that led to the variation) or if the result is much larger than the noise, the value could be used.

It should be understood that performance measurement techniques may comprise measuring the intensity of light reflected by an object, measuring the attenuation of signal strength, measuring performance metrics associated with the type of sensor, or any other technique that returns performance measurements that may be compared to each other to determine the effectiveness of a system, such as an enhanced sensor cleaning validation system.

After ensuring the performance measurement ratio between the clean state and the dirty state is within the range, the enhanced sensor cleaning validation system may then be applied to remove the obstruction from the sensor. The enhanced sensor cleaning validation system may facilitate a post-clean sensor performance measurement. The enhanced sensor cleaning validation system may facilitate a division of the post-clean sensor performance measurement and the initial sensor performance measurement. The resulting ratio of performance may indicate how well the enhanced sensor cleaning validation system has performed. Multiple ratio values may be obtained at different measurement instances, which would then be evaluated to determine the validation of the enhanced sensor cleaning validation system.

Looking at FIG. 3, there are shown several measurements that capture the performance ratio at various stages of a sensor lens. That is a performance measurement ratio between a hypothetical clean state (e.g., 100% clean) and an initial clean state (after being manually cleaned), between a dirty state and the initial clean state, a performance measurement ratio between a post-clean state and the initial clean state. For example, the group of measurements 302 may be associated with clean performance measurements, dirty performance measurements, and post-clean performance measurements. As can be seen in the group of measurements 302, a higher value means a higher performance ratio, which indicates a better performance. In this group of measurements 302, the initial clean performance measurement ratio is higher than the dirty performance measurement ratio. Also, it is shown that the post-clean performance measurement ratio is higher than the dirty performance measurement ratio. This indicates that the enhanced sensor cleaning validation system is performing as expected because the performance measurement ratio after the application of the enhanced sensor cleaning validation system resulted in a higher ratio than the dirty performance measurement ratio. Further, the post-clean performance measurement ratio shows that it stands between 0.86 and 0.93. This may be compared to a validation threshold to determine whether the enhanced sensor cleaning validation system is performing up to par. For example, an enhanced sensor cleaning validation system may be considered to be performing as expected the post-clean performance measurement ratio is anywhere between 0.85 and 1. Looking at the group of measurements 304, there is shown that the clean performance measurement ratio is less than the dirty performance measurement ratio and the post-clean performance measurement ratio. This may not be as expected because one would expect that the clean performance measurement ratio may be greater than the dirty performance measurement ratio. This could be due to various factors such as the type of obstruction applied, the noise introduced by the obstruction, or other test environment factors. It should be noted that an enhanced sensor cleaning validation system may evaluate a sensor cleaning performance, but it may also be used to evaluate the performance of an on-vehicle obstruction detection system that triggers the cleaning system in a normal operation. It should also be noted that the enhanced sensor cleaning validation system may be able to achieve very high performance measurement resolution because it can compare back to controlled baseline data and large data sets. The on-vehicle obstruction detection system may need to perform without this additional information. The performance of the on-vehicle obstruction detection system performance may be evaluated using the enhanced sensor cleaning validation system to provide information on the accuracy of the system (ratio of false-positives vs false-negatives) given the validation threshold value.

It is understood that the above descriptions are for purposes of illustration and are not meant to be limiting.

Figure 4:
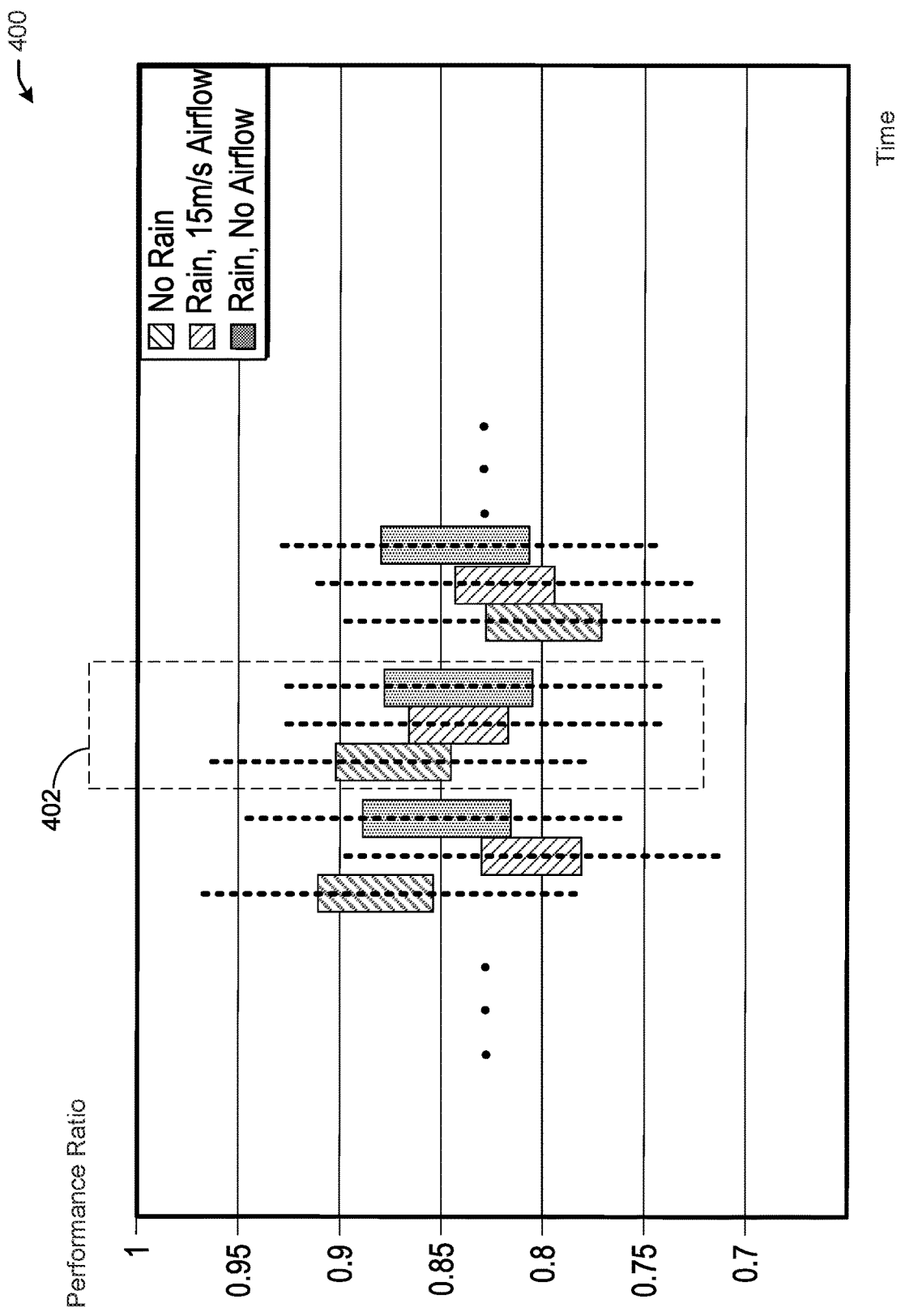
FIG. 4 depicts an illustrative schematic diagram for enhanced sensor cleaning validation, in accordance with one or more example embodiments of the present disclosure.

FIG. 4 depicts an illustrative schematic diagram for enhanced sensor cleaning validation, in accordance with one or more example embodiments of the present disclosure.

Referring to FIG. 4, there is shown a performance ratio chart between various types of sensor conditions. These various types of sensor conditions may include a no rain state, a rain with airflow state, and rain without airflow state. Looking at the group of measurements 402, it is shown that when the sensor does not have any rain on its lens, its performance ratio is anywhere between 0.84 and 0.9, while the performance ratio when rain is introduced as an obstruction to the sensor lens while having an airflow is anywhere between 0.82 and 0.86. The introduction of airflow causes the rain droplets to the removed off of the sensor lens. Further, it is shown that the performance ratio when rain is introduced as an obstruction to the sensor lens without airflow is anywhere between 0.81 and 0.87. Additional measurements may be taken in order to capture a larger data set. Subsequently, all the measurements may be evaluated to determine how the rain affects the sensor. That information may be useful for the vehicle's software applications that rely on sensor data being collected during operation of the sensor with expected performance levels under these environmental factors (e.g., rain) in order to process the sensor data. For example, after the enhanced sensor cleaning validation system determines the expected performance levels, the software applications are then capable of evaluating any captured sensor data based on the expected range in order to implement compensation mechanisms when evaluating the captured sensor data. It is understood that the above descriptions are for purposes of illustration and are not meant to be limiting.

Figure 5:
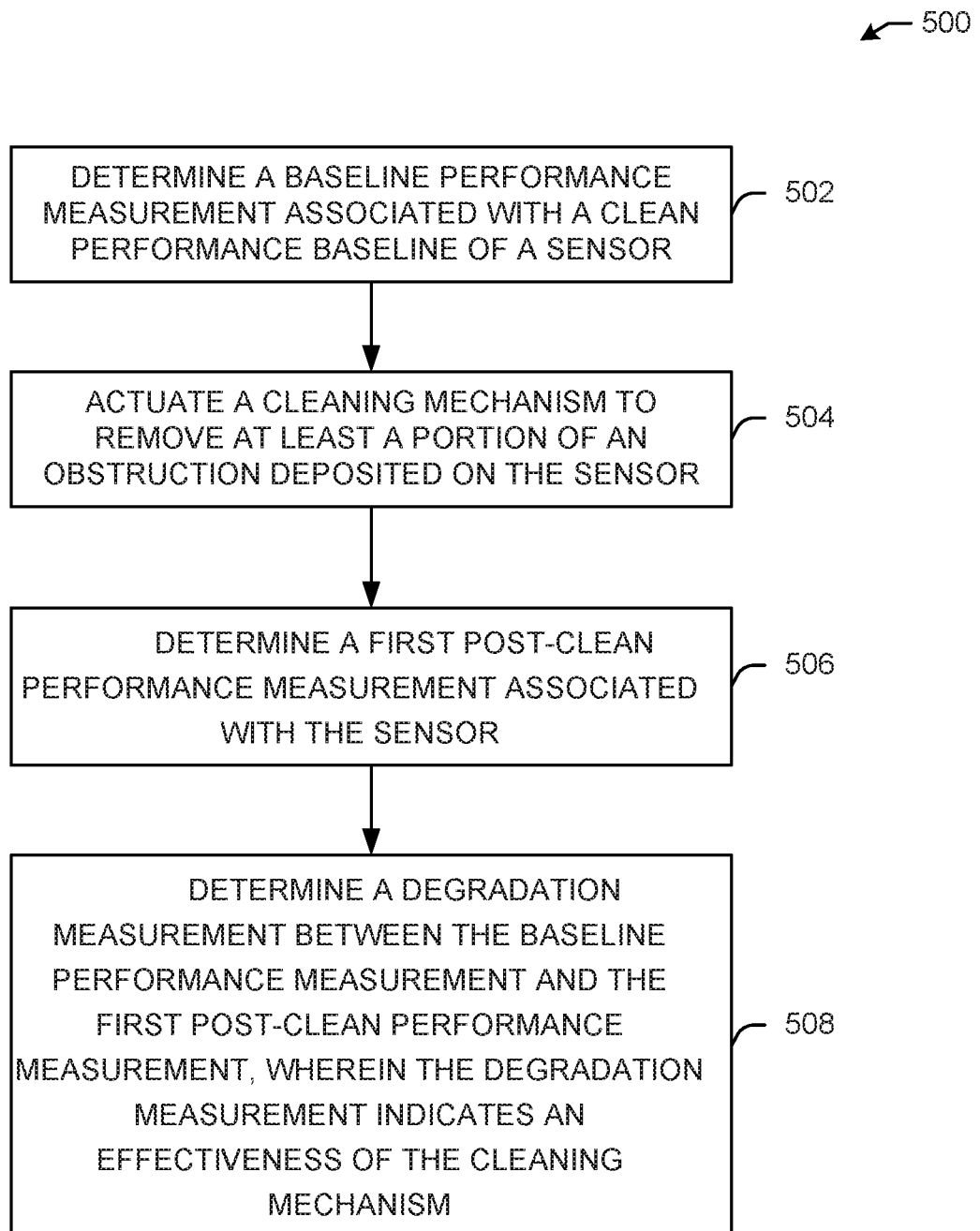
FIG. 5 illustrates a flow diagram of a process for an illustrative enhanced sensor cleaning validation system, in accordance with one or more example embodiments of the present disclosure.

FIG. 5 illustrates a flow diagram of process 500 for an illustrative enhanced sensor cleaning validation system, in accordance with one or more example embodiments of the present disclosure.

At block 502, a device may determine a baseline performance measurement associated with a clean performance baseline of a sensor. The clean performance baseline of the sensor may be a state of the sensor without the obstruction.

At block 504, the device may actuate a cleaning mechanism to remove at least a portion of an obstruction deposited on the sensor. The obstruction may be at least one of mud, rain, bugs, or debris. Actuating the cleaning mechanism causes an application of fluid on the sensor, and causes an airflow configured to remove droplets of the fluid containing at least part of the obstruction from the sensor.

At block 506, the device may determine a first post-clean performance measurement associated with the sensor.

At block 508, the device may determine a degradation measurement between the baseline performance measurement and the first post-clean performance measurement, wherein the degradation measurement indicates an effectiveness of the cleaning mechanism. The degradation measurement may be a ratio between the baseline performance measurement and the first post-clean performance measurement. The ratio may be determined by dividing the first post-clean performance measurement by the baseline performance measurement. Also, actuating the cleaning mechanism causes an application of an airflow that removes rain droplets at an airflow rate that exceeds a rain rate. The degradation measurement may be a first degradation measurement. The device may determine a second post-clean performance measurement after a second obstruction may be applied to the sensor. The device may determine a second degradation measurement based on the baseline performance measurement and the second post-clean performance measurement. The device may determine a mean value or a standard deviation based on the first degradation measurement and the second degradation measurement. The device may determine a mean value or a standard deviation of one or more ratio values determined between one or more baseline performance measurements and one or more post-clean performance measurements may be below a validation threshold. The device may determine that the cleaning mechanism may be in a failed state. The device may determine a mean value or a standard deviation of one or more ratio values determined between one or more baseline performance measurements and one or more post-clean performance measurements may be above a validation threshold. The device may determine that the cleaning mechanism may be in a pass state.

It is understood that the above descriptions are for purposes of illustration and are not meant to be limiting.

Figure 6:
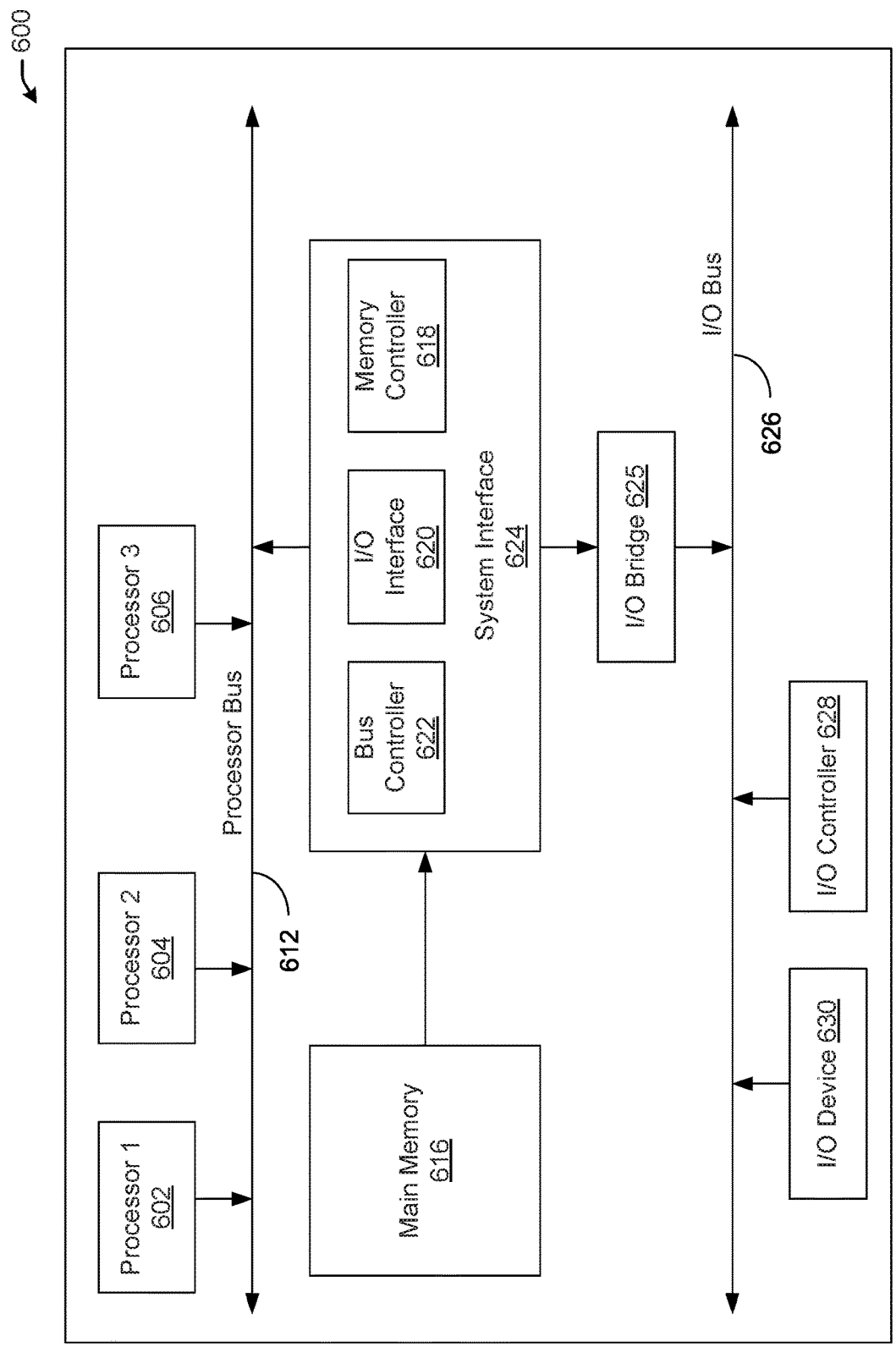
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent the one or more processors 132 and/or the one or more measurement devices of FIG. 2, and therefore may assess and validate the sensors 125 of FIG. 1. The computer system (system) includes one or more processors 602-606. Processors 602-606 may include one or more internal levels of cache (not shown) and a bus controller (e.g., bus controller 622) or bus interface (e.g., I/O interface 620) unit to direct interaction with the processor bus 612. An enhanced sensor cleaning validation device 609 may also be in communication with the Processors 602-606 and may be connected to the processor bus 612.

Processor bus 612, also known as the host bus or the front side bus, may be used to couple the processors 602-606 and/or the enhanced sensor cleaning validation device 609 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606 and/or the enhanced sensor cleaning validation device 609. Another type of user input device includes cursor control, such as a mouse, a trackball, or cursor direction keys for communicating direction information and command selections to the processors 602-606 and/or the enhanced sensor cleaning validation device 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606 and/or the my enhanced sensor cleaning validation device 609. Main memory 616 also may be used for storing temporary variables or other intermediate information during execution of instructions by the processors 602-606 and/or the enhanced sensor cleaning validation device 609. System 600 may include read-only memory (ROM) and/or other static storage device coupled to the processor bus 612 for storing static information and instructions for the processors 602-606 and/or the enhanced sensor cleaning validation device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 and/or the enhanced sensor cleaning validation device 609 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.), and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In one or more embodiments, a device comprising processing circuitry coupled to storage, the processing circuitry may be configured to: determine a baseline performance measurement associated with a clean performance baseline of a sensor; actuate a cleaning mechanism to remove at least a portion of an obstruction deposited on the sensor; determine a first post-clean performance measurement associated with the sensor; and determine a degradation measurement between the baseline performance measurement and the first post-clean performance measurement, wherein the degradation measurement indicates an effectiveness of the cleaning mechanism. The clean performance baseline of the sensor may be a state of the sensor without the obstruction. The obstruction may be at least one of mud, rain, bugs, or debris. The degradation measurement may be a ratio between the baseline performance measurement and the first post-clean performance measurement, and wherein the ratio may be determined by dividing the first post-clean performance measurement by the baseline performance measurement. Actuating the cleaning mechanism causes an application of fluid on the sensor, and causes an airflow configured to remove droplets of the fluid containing at least part of the obstruction from the sensor. The obstruction may be rain droplets, and wherein actuating the cleaning mechanism causes an application of an airflow that removes rain droplets at an airflow rate that exceeds a rain rate. The degradation measurement may be a first degradation measurement, and wherein the processing circuitry may be further configured to: determine a second post-clean performance measurement after a second obstruction may be applied to the sensor; determine a second degradation measurement based on the baseline performance measurement and the second post-clean performance measurement; and determine a mean value or a standard deviation based on the first degradation measurement and the second degradation measurement. The processing circuitry may be further configured to: determine a mean value or a standard deviation of one or more ratio values determined between one or more baseline performance measurements and one or more post-clean performance measurements may be below a validation threshold; and determine that the cleaning mechanism may be in a failed state. The processing circuitry may be further configured to: determine a mean value or a standard deviation of one or more ratio values determined between one or more baseline performance measurements and one or more post-clean performance measurements may be above a validation threshold; and determine that the cleaning mechanism may be in a pass state.

In one or more embodiments, a method may comprise: determining, by one or more processors, a baseline performance measurement associated with a clean performance baseline of a sensor; actuating a cleaning mechanism to remove at least a portion of an obstruction deposited on the sensor; determining a first post-clean performance measurement associated with the sensor; and determining a degradation measurement between the baseline performance measurement and the first post-clean performance measurement, wherein the degradation measurement indicates an effectiveness of the cleaning mechanism. The clean performance baseline of the sensor may be a state of the sensor without the obstruction. The obstruction may be at least one of mud, rain, bugs, or debris. The degradation measurement may be a ratio between the baseline performance measurement and the first post-clean performance measurement, and wherein the ratio may be determined by dividing the first post-clean performance measurement by the baseline performance measurement. Actuating the cleaning mechanism causes an application of fluid on the sensor, and causes an airflow configured to remove droplets of the fluid containing at least part of the obstruction from the sensor. The obstruction may be rain droplets, and wherein actuating the cleaning mechanism causes an application of an airflow that removes rain droplets at an airflow rate that exceeds a rain rate. The degradation measurement may be a first degradation measurement, and further comprising: determining a second post-clean performance measurement after a second obstruction may be applied to the sensor; determining a second degradation measurement based on the baseline performance measurement and the second post-clean performance measurement; and determining a mean value or a standard deviation based on the first degradation measurement and the second degradation measurement. The method may further comprise: determining a mean value or a standard deviation of one or more ratio values determined between one or more baseline performance measurements and one or more post-clean performance measurements may be below a validation threshold; and determining that the cleaning mechanism may be in a failed state. The method may further comprise: determining a mean value or a standard deviation of one or more ratio values determined between one or more baseline performance measurements and one or more post-clean performance measurements may be above a validation threshold; and determining that the cleaning mechanism may be in a pass state.

In one or more embodiments, a non-transitory computer-readable medium storing computer-executable instructions which when executed by one or more processors result in performing operations may comprise: determining a baseline performance measurement associated with a clean performance baseline of a sensor; actuating a cleaning mechanism to remove at least a portion of an obstruction deposited on the sensor; determining a first post-clean performance measurement associated with the sensor; and determining a degradation measurement between the baseline performance measurement and the first post-clean performance measurement, wherein the degradation measurement indicates an effectiveness of the cleaning mechanism. The clean performance baseline of the sensor may be a state of the sensor without the obstruction. The obstruction may be at least one of mud, rain, bugs, or debris. The degradation measurement may be a ratio between the baseline performance measurement and the first post-clean performance measurement, and wherein the ratio may be determined by dividing the first post-clean performance measurement by the baseline performance measurement. Actuating the cleaning mechanism causes an application of fluid on the sensor, and causes an airflow configured to remove droplets of the fluid containing at least part of the obstruction from the sensor. The obstruction may be rain droplets, and wherein actuating the cleaning mechanism causes an application of an airflow that removes rain droplets at an airflow rate that exceeds a rain rate. The degradation measurement may be a first degradation measurement, and wherein the operations further comprise: determining a second post-clean performance measurement after a second obstruction may be applied to the sensor; determining a second degradation measurement based on the baseline performance measurement and the second post-clean performance measurement; and determining a mean value or a standard deviation based on the first degradation measurement and the second degradation measurement. The operations may further comprise: determining a mean value or a standard deviation of one or more ratio values determined between one or more baseline performance measurements and one or more post-clean performance measurements may be below a validation threshold; and determining that the cleaning mechanism may be in a failed state. The operations further comprise: determining a mean value or a standard deviation of one or more ratio values determined between one or more baseline performance measurements and one or more post-clean performance measurements may be above a validation threshold; and determining that the cleaning mechanism may be in a pass state.

In one or more embodiments, an apparatus may comprise means for: determining a baseline performance measurement associated with a clean performance baseline of a sensor; actuate a cleaning mechanism to remove at least a portion of an obstruction deposited on the sensor; determining a first post-clean performance measurement associated with the sensor; and determining a degradation measurement between the baseline performance measurement and the first post-clean performance measurement, wherein the degradation measurement indicates an effectiveness of the cleaning mechanism. The clean performance baseline of the sensor may be a state of the sensor without the obstruction. The obstruction may be at least one of mud, rain, bugs, or debris. The degradation measurement may be a ratio between the baseline performance measurement and the first post-clean performance measurement, and wherein the ratio may be determined by dividing the first post-clean performance measurement by the baseline performance measurement. The cleaning mechanism causes an application of fluid on the sensor, and causes an airflow configured to remove droplets of the fluid containing at least part of the obstruction from the sensor. The obstruction may be rain droplets, and wherein actuating the cleaning mechanism causes an application of an airflow that removes rain droplets at an airflow rate that exceeds a rain rate. The degradation measurement may be a first degradation measurement, and further comprising: determining a second post-clean performance measurement after a second obstruction may be applied to the sensor; determining a second degradation measurement based on the baseline performance measurement and the second post-clean performance measurement; and determining a mean value or a standard deviation based on the first degradation measurement and the second degradation measurement. The apparatus may further comprise: determining a mean value or a standard deviation of one or more ratio values determined between one or more baseline performance measurements and one or more post-clean performance measurements may be below a validation threshold; and determining that the cleaning mechanism may be in a failed state. The apparatus may further comprise: determining a mean value or a standard deviation of one or more ratio values determined between one or more baseline performance measurements and one or more post-clean performance measurements may be above a validation threshold; and determining that the cleaning mechanism may be in a pass state.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving a signal from a sensor indicative of an obstruction on the sensor;
   activating a cleaning system at a degree of actuation responsive to the obstruction;
   obtaining a first post-clean performance measurement of the sensor; and
   adjusting the degree of actuation of the cleaning system based on a degradation measurement between a baseline performance measurement associated with a clean performance baseline of the sensor and the first post-clean performance measurement.

2. The method of claim 1, wherein the clean performance baseline of the sensor is a state of the sensor without the obstruction.

3. The method of claim 1, wherein actuating the cleaning system causes an application of fluid on the sensor, and causes an airflow configured to remove droplets of the fluid containing at least part of the obstruction from the sensor.

4. The method of claim 1, further comprising:
   obtaining a mean value or a standard deviation value based on the degradation measurement and an additional degradation measurement, wherein the additional degradation measurement is based on the baseline performance measurement and a second post-clean performance measurement obtained after a second obstruction is present on the sensor.

5. The method of claim 4, further comprising:
   determining that the mean value or the standard deviation value is above a validation threshold; and
   determining that the cleaning system is in a pass state.

6. The method of claim 1, wherein the baseline performance measurement and the first post-clean performance measurement each comprise a respective measurement, by the sensor, of an intensity of light reflected by an object.

7. The method of claim 1, wherein the baseline performance measurement and the first post-clean performance measurement each comprise a respective measurement of attenuation of a signal strength by the sensor.

8. A device, comprising:
   a memory; and
   at least one processor coupled to the memory and configured to execute operations comprising:
      receiving a signal from a sensor indicative of an obstruction on the sensor;

activating a cleaning system at a degree of actuation responsive to the obstruction;

obtaining a first post-clean performance measurement associated with the sensor, and adjusting the degree of actuation of the cleaning system based on a degradation measurement between a baseline performance measurement associated with a clean performance baseline of the sensor and the first post-clean performance measurement.

9. The device of claim 8, wherein the clean performance baseline of the sensor is a state of the sensor without the obstruction.

10. The device of claim 8, wherein actuating the cleaning system causes an application of fluid on the sensor, and causes an airflow configured to remove droplets of the fluid containing at least part of the obstruction from the sensor.

11. The device of claim 8, further comprising:

obtaining a mean value or a standard deviation value based on the degradation measurement and an additional degradation measurement, wherein the additional degradation measurement is based on the baseline performance measurement and a second post-clean performance measurement obtained after a second obstruction is present on the sensor.

12. The device of claim 11, the operations further comprising:

determining that the mean value or the standard deviation value is above a validation threshold; and determining that the cleaning system is in a pass state.

13. The device of claim 8, wherein the baseline performance measurement and the first post-clean performance measurement each comprise a respective measurement, by the sensor, of an intensity of light reflected by an object.

14. The device of claim 8, wherein the baseline performance measurement and the first post-clean performance measurement each comprise a respective measurement of attenuation of a signal strength by the sensor.

15. A non-transitory computer-readable medium having instructions stored thereon that, when executed by at least one computing device, cause the at least one computing device to perform operations comprising:

receiving a signal from a sensor indicative of an obstruction on the sensor;

activating a cleaning system at a degree of actuation responsive to the obstruction;

obtaining a first post-clean performance measurement associated with the sensor, and adjusting the degree of actuation of the cleaning system based on a degradation measurement between a baseline performance measurement associated with a clean performance baseline of the sensor and the first post-clean performance measurement.

16. The non-transitory computer-readable medium of claim 15, wherein the clean performance baseline of the sensor is a state of the sensor without the obstruction.

17. The non-transitory computer-readable medium of claim 15, wherein actuating the cleaning system causes an application of fluid on the sensor, and causes an airflow configured to remove droplets of the fluid containing at least part of the obstruction from the sensor.

18. The non-transitory computer-readable medium of claim 15, wherein the degradation measurement is a first degradation measurement, and the operations further comprising:

obtaining a mean value or a standard deviation value based on the degradation measurement and an additional degradation measurement, wherein the additional degradation measurement is based on the baseline performance measurement and a second post-clean performance measurement obtained after a second obstruction is present on the sensor.

19. The non-transitory computer-readable medium of claim 15, wherein the baseline performance measurement and the first post-clean performance measurement each comprise a respective measurement, by the sensor, of an intensity of light reflected by an object.

20. The non-transitory computer-readable medium of claim 15, wherein the baseline performance measurement and the first post-clean performance measurement each comprise a respective measurement of attenuation of a signal strength by the sensor.

* * * * *